April 18, 1933.                B. F. ROBERTS                1,904,032
                    APPARATUS FOR SCREENING MATERIALS
                           Filed Jan. 16, 1931
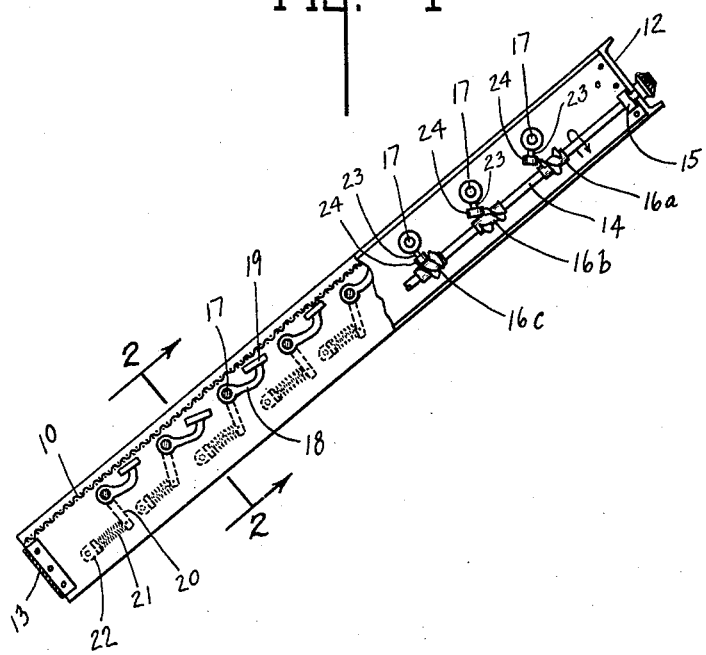
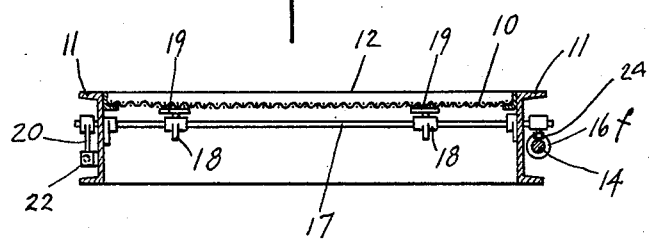
INVENTOR.
BENJAMIN F. ROBERTS.
BY
Lockwood Lockwood Goldsmith & Gatt
ATTORNEYS.

Patented Apr. 18, 1933

1,904,032

UNITED STATES PATENT OFFICE

BENJAMIN F. ROBERTS, OF BRAZIL, INDIANA

APPARATUS FOR SCREENING MATERIALS

Application filed January 16, 1931. Serial No. 509,044.

This invention relates particularly to a method and apparatus for screening clay but is useful in the screening of many other types of material.

The principal object of the invention is to provide a simple and efficient method and apparatus for agitating the screen to prevent the lodgment thereon of unscreened material and consequent clogging of the screen.

In the screening of clay for the manufacture of brick or other ceramic products, the screen is usually tilted at an acute angle and the clay is delivered thereto adjacent the upper end. The said clay may be kept moving on the screen most advantageously by means of agitating blows struck upon the under surface of the screen. A principal feature of this invention resides in the fact that these blows are delivered progressively from the top to the bottom of the screen. In this method, clay dislodged by a blow at the upper end reaches a slightly lower position coincident with the delivery of a second blow at the latter position. This progressive delivery of blows as the clay descends effectively prevents clogging of the screen under all normal conditions.

Another feature of the invention resides in the specific form of apparatus employed for delivering the agitating blows. This form of apparatus is useful irrespective of the progressive delivery of the said blows.

Other objects and features of the invention will be understood from the accompanying drawing and the following description and claims:

Figure 1 is an elevational view partly in section of a clay screen and frame to which the invention has been applied. Figure 2 is a sectional view taken on the line 2—2 of Figure 1.

In the drawing a screen 10 is carried upon a rectangular framework consisting of a channel member 11 on each side, a channel member 12 at the upper end and a plate 13 at the lower end. The said frame is mounted at an acute angle as shown in Figure 1 upon suitable supports not shown and the dried and ground clay is delivered thereto adjacent the upper end. The clay of the desired fineness passes through the screen while the tailings are discharged at the lower end over the plate 13. A shaft 14 is carried upon suitable bearings, one of which is shown at 15 upon one of the channel members 11. The said shaft is driven in the direction of the arrow in Figure 1 from any suitable source of power and carries a plurality of worms 16a, 16b, etc. A plurality of cross shafts 17 are mounted upon the channel members 11 and extend beneath the screen 10. The said shafts correspond in number to the worms 16a, etc. and each is located immediately adjacent one of said worms. Each of the shafts 17 carries one or more arms 18 in turn carrying strikers 19 positioned beneath the screen 10. Each shaft 17 also carries an arm 20 against which abuts a compression spring 21, the opposite end of which seats upon an abutment 22 carried by one of the channel members 11. Each shaft 17 likewise carries an arm 23 in turn carrying a roller 24 and each of said rollers engages one of the worms 16a, etc.

In the operation of the device, the rotation of shaft 14 in the direction of the arrow causes each of the worms 16a, etc. to press its corresponding roller in a clockwise direction (Figure 1) about the axis of the corresponding shaft 17. This motion is resisted by the action of the spring 21. When each of the worms has progressed a sufficient distance so that the end of its blade passes from engagement with the corresponding roller 24, the shaft 17 is free to move in the counterclockwise direction under the influence of the spring 21. In this motion, the strikers 19 are thrown into contact with the underside of the screen 10 and a blow is given thereto which loosens any clay which may have lodged upon the surface of the screen.

As shown in Figure 1, the worms 16a, etc. are progressively set upon the shaft so that each worm actuates its striker immediately before the next lowermost worm. Thus the worm 16a in the drawing has reached the position where a very small further movement will permit the action of the striker. The worm 16b has progressed only a part of the way toward the striking position and the worm 16c is just commencing its movement toward the striking position. In this manner the blows of strikers 19 are successively delivered from top to bottom of the screen.

While the successive action of the strikers is an important feature of the invention, the method of actuating the individual strikers by means of the specific form of mechanism shown herein is also an important feature. This mechanism permits each striker to deliver a blow which may be accurately adjusted in strength by adjustment or suitable choice of the springs 21. The striking force is, therefore, independent of the actual motivating power.

The invention claimed is:

1. In combination with a screen, an agitating striker therefor, a rock shaft upon which said striker is mounted, an arm carried by said shaft, a worm rotatable about an axis in a plane transverse to the axis of said rock shaft, the blade of said worm engaging said arm and moving the same to rock said shaft in one direction when said worm is rotated, and yielding means for resisting the rocking of said shaft and for returning the same to initial position to cause said striker to strike said screen when said arm reaches the end of its engagement with said worm.

2. In combination with an inclined screen, a plurality of agitating strikers therefor arranged in succession from top to bottom of said screen, a rock shaft carrying each of said strikers, an arm attached to each of said shafts, a power shaft having its axis in a plane transverse to the axis of said rock shafts, a plurality of worms carried by said power shaft the blade of each worm engaging one of said arms and moving the same to rock the corresponding rock shaft in one direction when said power shaft is rotated, and yielding means for resisting the rocking of said rock shafts and for returning the same to initial position to cause said strikers to strike said screen when said arms reach the end of their engagement with said worms, said worms being so placed upon said power shaft that the strikers are actuated progressively from top to bottom of said screen.

In witness whereof, I have hereunto affixed my signature.

BENJAMIN F. ROBERTS.